E. T. MUELLER.
CHAIN LINK.
APPLICATION FILED MAY 21, 1917.
1,271,202.
Patented July 2, 1918.
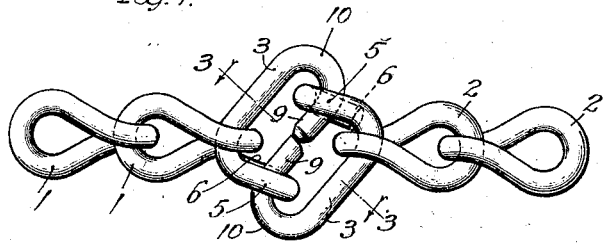
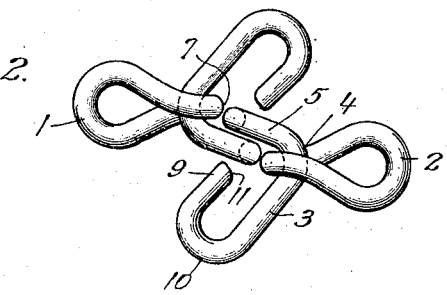
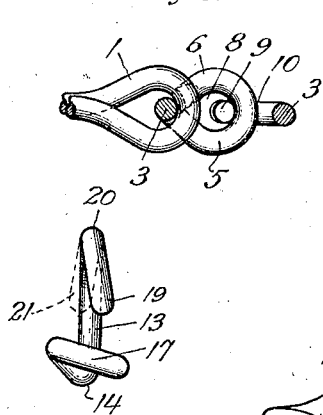
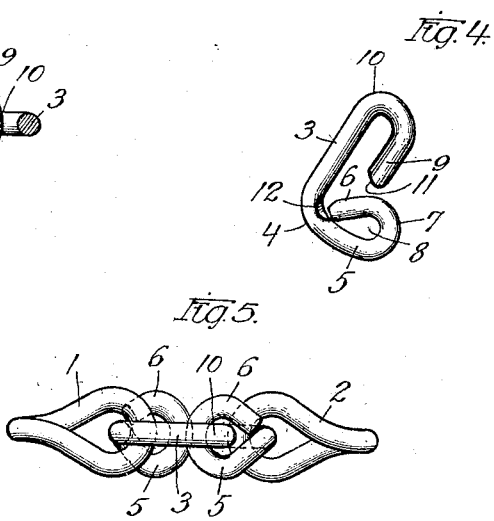
Witnesses:
Roberts Weir
Arthur W. Carlson
Inventor
Edward T. Mueller
By Hie & Hie Attys.

UNITED STATES PATENT OFFICE.

EDWARD T. MUELLER, OF CHICAGO, ILLINOIS, ASSIGNOR OF ONE-HALF TO EDWARD A. CHRISTOPH, OF CHICAGO, ILLINOIS.

CHAIN-LINK.

1,271,202.
Specification of Letters Patent.
Patented July 2, 1918.

Application filed May 21, 1917. Serial No. 169,910.

*To all whom it may concern:*

Be it known that I, EDWARD T. MUELLER, a citizen of the United States, residing at Chicago, in the county of Cook and State of Illinois, have invented certain new and useful Improvements in Chain-Links, of which the following is a description.

My invention belongs to that general class of devices known as chain links or the like, and relates more particularly to coöperating links adapted for emergency use in connecting or repairing the parts of chains, cables or the like. The same is particularly intended and designed to be used as an emergency repair link, adapted for repairing broken cross chains on anti-skid chains commonly used in connection with automobile or vehicle wheels, but its use is not confined solely to the repairs of such chains, as the same may be used wherever found applicable. In practice the cross chains of anti-skid chains usually wear out quite rapidly, and when the cross chain breaks or gives way as the result of a link wearing through and dropping out, the chains fail to serve the purpose for which they are intended and may strike the mud guards or other parts of the machine, injuring the same, as well as creating a very objectionable noise. The breaking of one or perhaps several cross chains might not seriously impair the efficiency of the anti-skidding chain, although frequently accident is the result, for if the wheels happen to be locked at a point where there are no cross chains on or adjacent the ground, the entire chain would be without value. Further, the breaking of a number of links of the cross chain would not only render the skid chain inefficient, but might permit the chain to drop on the axle and the car be greatly damaged.

Cross chains commonly and extensively used are usually attached to the side chains by means of hooks, which are closed down or clenched on the links of the side chains, so that the cross chains are securely locked in place. When a cross chain becomes broken the hooks are pried open and the worn parts of the cross chain removed and complete new cross chain positioned. In this case the worn or remaining parts of the broken cross chain are usually thrown away, and sometimes when not entirely worn out.

My invention has among its objects the production of a device of the kind described that is simple, convenient, durable, efficient and satisfactory, for use wherever found applicable. It has particularly as an object the production of a connection or repair device that may be quickly and easily attached or detached without the use of tools, but at the same time a construction that will not pull apart or release accidentally. Other objects and advantages of the construction herein described will be obvious to those skilled in the art from the disclosure herein made.

To this end my invention consists in the novel construction, arrangement and combination of parts herein shown and described, and more particularly pointed out in the claims.

In the drawings, wherein like reference characters indicate like or corresponding parts, Figure 1 is a plan view of several links connected by my device;

Fig. 2 is a similar view illustrating the applying or removing of the connection;

Fig. 3 is a sectional view taken substantially on line 3—3 of Fig. 1;

Fig. 4 is a perspective view of one of the links making up the connection;

Fig. 5 is a view in elevation of the same as shown in Fig. 1, and

Fig. 6 is a view in elevation of a slightly modified link.

Referring to the drawings, 1—1; 2—2 represent parts of a chain or the like which are to be connected together, as for example, links of a cross chain for anti-skid chains. My device preferably consists of two similarly formed links or parts arranged to engage the end links of the cross-chain parts and each other, and securely connect said cross-chain ends. Each link or part consists of a body portion 3 of wire or equivalent material bent or formed as at 4 to provide the offset 5, the end 6 of which is bent back as at 7 to provide an eye or loop 8. The free end 6 is preferably extended substantially close to the bend 4, as shown in the drawings, the size of the loop or eye being as desired, this ordinarily depending upon the gage of the material used. The opposite end of the wire 3 is bent at 10 to provide the hook end 9, the end 11 of which may be formed as desired. The end 9 may lie substantially parallel to 3 or with the end bent in a little as shown.

The inner side of the link at the bend 4 may be slightly cut away or formed as at 12, if desired, although this is not necessary.

It will be noted by referring to Fig. 5 that the part 6 is bent over to one side so that when the eye 6 is formed, the end 11 of the hook 9 will be substantially in alinement or at the center of the eye. As before mentioned, the two links are similar or identical. To connect up the links 1 and 2, or their equivalents, the repair link part is engaged with the link 1, and the other co-operating part with the link 2, substantially as indicated in Fig. 2. The same are then moved so that the hooked end 9 of each engages the eye of the other one. The same, if desired, may be made so that the links must be turned slightly, for example as indicated by the dotted lines in Fig. 3, before they will slip together or apart easily. It will be noted by referring particularly to Fig. 1, that the loop forming the eye is turned back slightly toward the end of the hook of the link. When in use the strain on the two links tends to pull and maintain them together, so that the more strain the more securely they are held together. It has been found that there is practically no tendency whatever for the connecting parts to accidentally disengage and unlock and thereby release the ends of the chain, this being true even though the cross-chain is not taut. Should the connecting link parts outlive the other portions of the cross-chains the same may be used until worn out. Owing to the ease with which the ends of the cross-chain may be re-united there is no occasion to drive with a broken cross-chain. Where, however, time and trouble are required in replacing a cross-chain on the road, the tendency is to drive on and repair it at a more convenient time. As a result with a chain badly worn the driver may pull with a skid chain having all of its cross-chains intact although worn. Perhaps within a few blocks one or even several of the chains may give way, due to weakness, or as a result of a sudden stop or other reason. The driver may, and usually will, continue for any number of miles to his destination with a broken chain or chains, and the trip finally terminate in an accident owing to his neglect to immediately repair a broken cross-chain or chains. With my device, requiring but a moment's time, no tools, and slight inconvenience, the driver repairs his chain as soon as a break is discovered, and proceeds in safety. It will be noted that the employment of my link or connection does not materially change the appearance of the chain.

In the slightly modified construction shown in Fig. 6, 13 represents the shank of one of the ring parts bent at 14, and over at 17 to provide an eye, the same being shown at a slight angle to the shank. The opposite end of the shank is bent at 20 to form the hook 19, which is shown turned slightly to one side. I have also indicated in the dotted lines 21 how the same might be turned toward the opposite side, should this be desired. The bend as at 19, however, is preferred. It is of course understood that the complete ring or connecting part consists of the two similar parts, only one of which is shown in Fig. 6. While I have referred to this as a modified construction, to all intents and purposes it is as much the preferred construction as that shown in the other figures, and in some cases would prove more desirable.

Having thus described my invention, it is obvious that various immaterial modifications may be made in the same within the scope of the appended claims without departing from the spirit of my invention; hence I do not wish to be understood as limiting myself to the exact form, construction, arrangement or combination of parts herein shown and described, or uses mentioned.

What I claim as new and desire to secure by Letters Patent is:—

1. A repair device for chains comprising a plurality of identical coöperating parts, each part consisting of a straight shank having an eye at one end and bent back upon itself at the other substantially parallel with the shank.

2. A repair device for chains comprising a plurality of similar coöperating engaging parts, each part consisting of a shank having an eye at one end and a hook at the other, the free end of the hook at one end of the shank being brought adjacent the eye at the other end of the shank, said parts detachably assembled together with the hook of each one in engagement with the eye of the other.

3. A link consisting of a wire bent to constitute a shank with a hook at one end and an eye at the opposite end, the free end of the hook extending substantially parallel with the shank, the hook and the eye being separated a distance slightly greater than the thickness of the wire constituting the eye.

4. In a device of the kind described, a link constructed of wire bent at each end to provide a shank having a hook at one end and a closed loop at the other end, the looped end being formed in a plane at an angle to the plane of the shank and hooked end.

5. A link consisting of a wire bent to constitute a shank with a hook at one end and an eye at the opposite end, the free end of the hook and the eye being adjacent, the extreme end of the hook being bent toward and lying substantially at the center of the eye at the opposite end.

6. A link of the kind described consisting of a wire bent back upon itself at one end to provide a hook, and bent at the opposite end to provide a closed loop adjacent the free end of the hook, the bend at said last mentioned end being at an angle to the plane of said hooked end and shank.

7. A link of the kind described consisting of a wire bent back upon itself at one end to provide a hook, and bent at the opposite end to provide a loop, said last mentioned end being bent in a plane at an angle to the plane of said hooked end and shank, and bent at its outer side toward the free end of the hook.

8. A link of the kind described consisting of a wire bent back upon itself at one end to provide a hook, and bent at the opposite end to provide a loop, in a plane at an angle to the plane connecting said hooked end and shank, and bent at its outer side toward the free end of the hook, the free end of the hook being spaced from the eye a distance slightly greater than the thickness of the wire.

9. In a device of the kind described and in combination, two coöperating engaging parts, said parts each consisting of a piece of wire bent back upon itself at one end to provide an open hook, the opposite end being bent at an angle to the axis of the shank and slightly toward the shank and free end of the hook, to provide a closed loop with the free end of the hook adjacent the center of the eye formed at the opposite end of its shank, whereby when the parts are assembled with the hook of one engaging the loop of the other, the shanks and hooked ends extend substantially parallel, and the loop of one extends parallel with the loop of the other.

10. A chain connection of the kind described, comprising a plurality of parts, each part consisting of a wire shank bent back upon itself at one end to constitute a hook and formed with a loop at the opposite end at substantially a right angle to the plane of the shank and opposite end, the looped part bent back toward the opposite end, said looped portion bent slightly backward toward the free end of the hook with the center of the loop adjacent the free end of the hook, and arranged to engage a link at the juncture of the loop and shank, said parts constructed to detachably engage each other, with the hook of each one engaging in the loop of the opposite one.

In testimony whereof, I have hereunto signed my name in the presence of two subscribing witnesses.

EDWARD T. MUELLER.

Witnesses:
 Roy W. Hill,
 Charles I. Cobb.

Copies of this patent may be obtained for five cents each, by addressing the "Commissioner of Patents, Washington, D. C."